US008237696B2

(12) United States Patent
Chung et al.

(10) Patent No.: US 8,237,696 B2
(45) Date of Patent: Aug. 7, 2012

(54) INTELLIGENT DIGITAL PHOTO FRAME

(75) Inventors: Shin-Hong Chung, Taipei Hsien (TW); Xiao-Guang Li, Shenzhen (CN); Han-Che Wang, Taipei Hsien (TW); Fen Li, Shenzhen (CN); Kuan-Hong Hsieh, Taipei Hsien (TW); Feng Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 477 days.

(21) Appl. No.: 12/475,579

(22) Filed: May 31, 2009

(65) Prior Publication Data

US 2010/0013810 A1 Jan. 21, 2010

(30) Foreign Application Priority Data

Jul. 18, 2008 (CN) .......................... 2008 2 0301548

(51) Int. Cl.
*G09G 5/00* (2006.01)
*G06F 3/038* (2006.01)

(52) U.S. Cl. ......................................... 345/207; 40/700

(58) Field of Classification Search .................. 345/207; 40/700, 714
See application file for complete search history.

(56) References Cited

U.S. PATENT DOCUMENTS

| | | | | |
|---|---|---|---|---|
| 2006/0170669 | A1 * | 8/2006 | Walker et al. | 345/418 |
| 2006/0192748 | A1 * | 8/2006 | Lowles et al. | 345/102 |
| 2009/0153438 | A1 * | 6/2009 | Miller et al. | 345/55 |

* cited by examiner

*Primary Examiner* — Stephen Sherman
(74) *Attorney, Agent, or Firm* — Altis Law Group, Inc.

(57) ABSTRACT

A digital photo frame (DPF) includes a power source, a display panel, a light detector, a motion detector, a processing unit, and a power management unit. The light detector is configured to detect the ambient brightness. The motion detection unit is configured to detect whether anyone is around. The processing unit is connected to the light detector and the motion detector. If the motion detector detects someone is around the DPF and the light detector detects the ambient brightness is below a predetermined value, the processing unit controls the power management unit to provide power to the display panel.

1 Claim, 1 Drawing Sheet

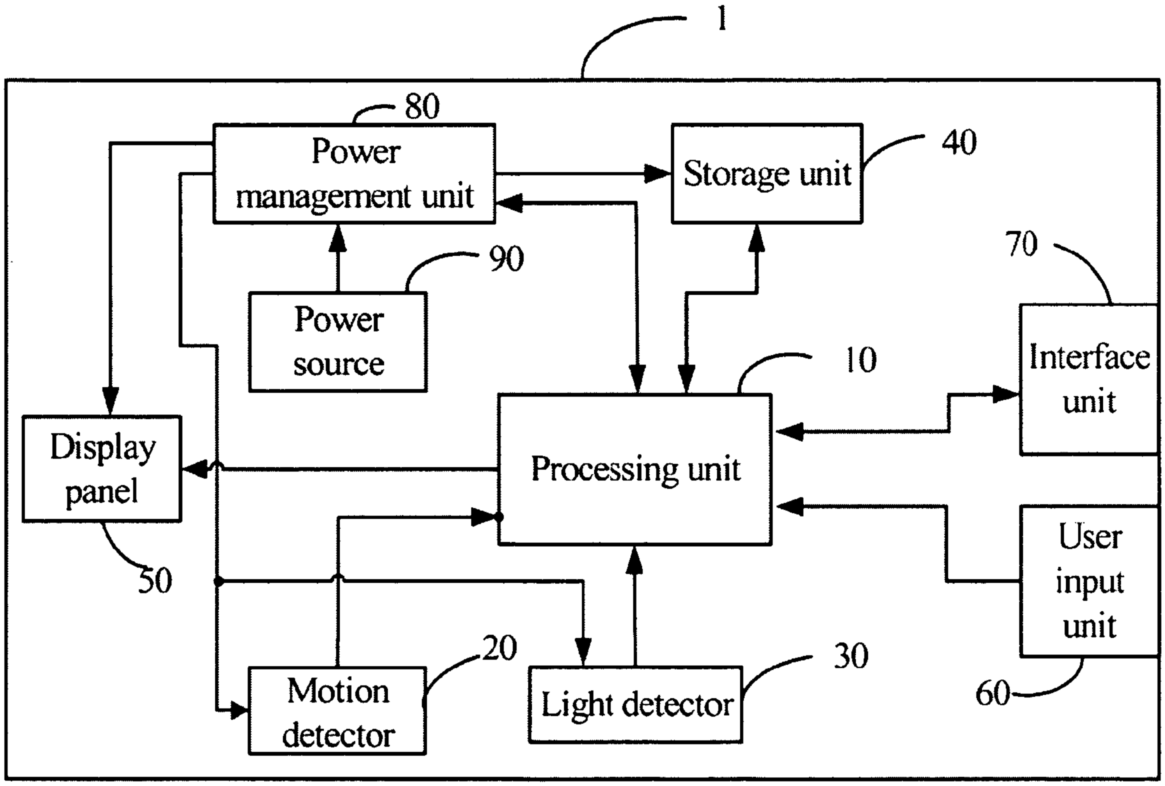
1
80
Power management unit
Storage unit
40
90
Power source
70
10
Interface unit
Display panel
Processing unit
User input unit
50
20
Motion detector
Light detector
30
60

INTELLIGENT DIGITAL PHOTO FRAME

RELATED APPLICATIONS

This application is related to copending applications entitled, "DIGITAL PHOTO FRAME CAPABLE OF AUTOMATICALLY CHANGING DISPLAY MODE", filed May 31, 2009 Ser. No. 12/475,578; "DIGITAL PHOTO FRAME WITH BATTERY INDICATOR", filed May 31, 2009 Ser. No. 12/475,580; "DIGITAL PHOTO FRAME CAPABLE OF ATTRACTING ATTENTION", filed May 31, 2009 Ser. No. 12/475,581; and "DIGITAL PHOTO FRAME CAPABLE OF ATTRACTING ATTENTION", filed May 14, 2009 Ser. No. 12/466,346.

BACKGROUND

1. Technical Field

The disclosure relates to electronic devices and, particularly, to a digital photo frame.

2. Description of Related Art

Nowadays, digital photos are getting more and more popular while digital cameras are becoming more and more affordable. Accordingly, in order to conveniently display digital photos, digital photo frames are invented.

Like the traditional photo frames, many digital photo frames can be either placed on a table or mounted on a wall. Because of their popularity, it would be useful if digital photo frames could serve other purposes as well.

Therefore, it is useful to provide a digital photo frame with additional functionality.

BRIEF DESCRIPTION OF THE DRAWINGS

The components in the drawing are not necessarily drawn to scale, the emphasis instead being placed upon clearly illustrating the principles of the digital photo frame.

The drawing is a block diagram of a digital photo frame in accordance with an exemplary embodiment.

DETAILED DESCRIPTION

Referring to the drawing, a digital photo frame (DPF) 1 includes a processing unit 10, a motion detector 20, a light detector 30, a storage unit 40, a display panel 50, a user input unit 60, an interface unit 70 (e.g., an input port or wireless transceiver), a power management unit 80, and a power source 90. The DPF 1 is capable of automatically providing light in an area around the DPF 1 upon sensing a person in the area and the area being relatively dark.

The interface unit 70 is configured to connect to an external electronic device (not shown). The external device can be a storage card (e.g., a secure digital SD card, a compact flash CF card) or another electronic device (e.g., a digital camera, a mobile phone, or a computer).

The user input unit 60 is configured to generate instructions in response to user operations. The user input unit 60 can be input keys/buttons, knobs, and the like. The power source 90 can be a battery or an AC/DC (alternating current to direct current) module. The power management unit 80 is configured to distribute power from the power source 90 to elements of the DPF 1, such as the processing unit 10, the motion detector 20, the light detector 30, and the display panel 50.

The storage unit 40 is configured to store displayable media such as digital pictures. The display panel 50 is configured to display the media.

The motion detector 20, connected to the processing unit 10, is configured for detecting whether there is someone around the DPF 1 within a predetermined area, and producing a trigger signal to the processing unit 10 when there is. The processing unit 10 is configured to control the power management unit 80 to power on the light detector 30 when receiving the trigger signal. The light detector 30 is also connected to the processing unit 10, and is configured to detect a current ambient brightness and produce a light signal to the processing unit 10 when detecting the current ambient brightness is lower than a predetermined value. The processing unit 10 is also configured to control the power management unit 80 to provide power to the display panel 50 when receiving the light signal, then, the display panel 50 is powered on and emits light. In other embodiments, the display panel 50 displays current time of day when it is powered on.

In the embodiment, the motion detector 20 continuously detects whether there is someone around the DPF 1. The motion detector 20 is also configured to produce a stop signal when it detects that nobody is within the predetermined area. The processing unit 10 controls the power management unit 80 to discontinue the power to the display panel 50 and other elements of the DPF 1 except the processing unit 10 and the motion detector 20 when receiving the stop signal. Thereby, if there is someone around the DPF 1 and the current ambient brightness is lower than the predetermined value, the DPF 1 is powered on automatically to light the surrounding area, and if there is nobody around the DPF 1, the DPF 1 is powered off automatically to avoid wasting power.

The motion detector 20 may include any one or more of the following, an infrared detector, a sonar detector, an audio detector, or the like, which can work singly or in combination according to preset parameters to generate a signal when it is likely one or more persons are present in the predetermined area. The DPF 1 is thus useful to provide light when, for example, a person enters a dark room and needs enough light to find the light switch for the room.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A method of automatically turn on or off of a digital photo frame (DPF), the DPF comprising:

a power management unit;

a display panel;

a motion detector;

a light detector;

a processing unit, the method comprising:

detecting whether there is someone around the DPF via the motion detector;

producing a trigger signal when the motion detector detects there is someone around the DPF;

controlling the power management unit to distribute power from a power source to the light detector when the processing unit receives the detection signal;

detecting whether a current ambient brightness is lower than a predetermined value via the light detector;

producing a light signal when the light detector detects the current ambient brightness is lower than the predetermined value; and controlling the power management unit to provide power to the display panel when the processing unit receives the light signal;

producing a stop signal via the motion detector when it detects there is nobody around the DPF; and controlling the power management unit to discontinue the power from the power source to the display panel and the light detector when the processing unit receives the stop signal.

* * * * *